United States Patent
Isgar (10) Patent No.: US 11,997,577 B2
(45) Date of Patent: *May 28, 2024

(54) OPEN CHANNEL COMMUNICATION SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,137

(22) Filed: Jan. 17, 2023

(65) Prior Publication Data

US 2023/0156445 A1 May 18, 2023

Related U.S. Application Data (63) Continuation of application No. 16/985,436, filed on Aug. 5, 2020, now Pat. No. 11,558,726.

(60) Provisional application No. 62/882,694, filed on Aug. 5, 2019.

(51) Int. Cl.
*H04W 4/80* (2018.01)
*G06Q 50/00* (2012.01)
*H04L 9/40* (2022.01)

(52) U.S. Cl.
CPC ............. *H04W 4/80* (2018.02); *G06Q 50/01* (2013.01); *H04L 63/04* (2013.01); *H04L 63/18* (2013.01)

(58) Field of Classification Search
CPC ......... H04W 4/80; G06Q 50/01; H04L 63/04; H04L 63/18
See application file for complete search history.

(56) References Cited

U.S. PATENT DOCUMENTS

| | | | | |
|---|---|---|---|---|
| 5,491,837 A | * | 2/1996 | Haartsen | H04W 52/0219 455/437 |
| 5,815,802 A | * | 9/1998 | Loechner, II | G08G 1/096783 455/515 |
| 6,763,226 B1 | | 7/2004 | Mczeal, Jr. | |
| 6,882,855 B2 | * | 4/2005 | Panchal | H04W 36/18 370/335 |
| 7,260,414 B2 | * | 8/2007 | Hassan | H04W 76/45 455/518 |

(Continued)

OTHER PUBLICATIONS

ISGAR, Social and Open Channel Communication Systems, Patent Cooperation Treaty Application Serial No. PCT/US21/44512, filed on Aug. 4, 2021, International Search Report and Written Opinion dated Jan. 18, 2022.

*Primary Examiner* — April G Gonzales
(74) *Attorney, Agent, or Firm* — Schmeiser, Olsen & Watts LLP (57) ABSTRACT

Described is an open communication system. The system includes a server having a memory storing user data and a first user computing device coupled to the server. The server may be programmed to allow multiple user computing devices to connect to the server and the server determines if the user computing devices are within a predetermined proximity to each other and whether the same communication channel is selected. All of the user computing devices that have selected the same communication channel and are within the predetermined proximity to each may be connected in an open communication link that allows the connected user to communicate. The system may include the option of establishing and invite particular users to a private or less used channel.

4 Claims, 8 Drawing Sheets

(56) References Cited

U.S. PATENT DOCUMENTS

| | | | | |
|---|---|---|---|---|
| 7,478,172 | B1* | 1/2009 | Lee | G06Q 10/06 |
| | | | | 709/250 |
| 7,502,827 | B2* | 3/2009 | Arfaa | H04L 51/04 |
| | | | | 455/414.1 |
| 7,664,517 | B2* | 2/2010 | Ananthanarayanan | |
| | | | | H04W 72/30 |
| | | | | 370/461 |
| 7,796,995 | B2* | 9/2010 | Gill | H04W 76/45 |
| | | | | 455/518 |
| 9,936,025 | B2* | 4/2018 | Cai | H04L 67/12 |
| 10,849,089 | B2* | 11/2020 | Dupray | G01S 5/0009 |
| 10,937,001 | B1* | 3/2021 | Isgar | G07C 9/00912 |
| 11,558,726 | B2* | 1/2023 | Isgar | H04W 12/02 |
| 2007/0202910 | A1* | 8/2007 | Brewer | H04W 76/45 |
| | | | | 455/521 |
| 2011/0225069 | A1* | 9/2011 | Cramer | G06Q 30/06 |
| | | | | 705/26.1 |
| 2012/0105475 | A1* | 5/2012 | Tseng | G01S 19/13 |
| | | | | 345/633 |
| 2014/0108530 | A1* | 4/2014 | Papakipos | G06Q 50/01 |
| | | | | 709/204 |
| 2015/0189026 | A1* | 7/2015 | Cohen | H04W 4/029 |
| | | | | 709/204 |
| 2017/0156026 | A1* | 6/2017 | Reudink | G06Q 30/02 |
| 2018/0248709 | A1* | 8/2018 | Leydon | H04L 51/212 |
| 2019/0364492 | A1* | 11/2019 | Azizi | H04W 76/14 |
| 2020/0120097 | A1 | 4/2020 | Amitay et al. | |
| 2020/0182651 | A1* | 6/2020 | Isgar | G01C 21/3476 |
| 2020/0219205 | A1* | 7/2020 | Isgar | G06Q 50/01 |

* cited by examiner

OPEN CHANNEL COMMUNICATION SYSTEM

CROSS REFERENCE TO RELATED APPLICATION

This application is a continuation of U.S. Patent Application entitled "OPEN CHANNEL COMMUNICATION SYSTEM," Ser. No. 16/985,436, filed Aug. 5, 2020, which claims priority to U.S. Provisional Patent Application entitled "OPEN CHANNEL COMMUNICATION SYSTEM," Ser. No. 62/882,694, filed Aug. 5, 2019, the disclosures of which are hereby incorporated entirely herein by reference.

BACKGROUND OF THE INVENTION

Technical Field

This invention generally relates to a system for communication, and more specifically to a system for anonymous open communication.

State of the Art

There are several instances where an individual may have a desire to communicate with another individual that is within a certain proximity to the individual. For example, on a road trip, in a line or in other circumstances when people like to communicate. Further, many people enjoy getting to know new people but lack the confidence to get to know someone when they have to interact face-to-face or in other circumstances wherein the individual may not feel safe. There lacks a system that allows users to communicate with each other anonymously.

Accordingly, what is needed is a system for anonymous open communication between users within proximity to each other.

SUMMARY OF THE INVENTION

An embodiment includes an open communication system comprising: a server having a memory storing user data; and a first user computing device coupled to the server, wherein the server is programmed to: receive a signal from the first user computing device that has accessed the system, wherein the signal includes user data having location information of the first user computing device; process the user data from the first user computing device and determine all other user computing devices within a predetermined proximity of the first user computing device and accessing the system; receive a signal from the first user computing device having channel data in response to a channel selected on the first user computing device through a user interface displayed on the first user computing device; and process the channel data and establish an open communication channel between user computing devices of all the other user computing devices that have selected the same channel.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to a system for anonymous open communication that is a modern-day alternative to the open communication enjoyed by CB radio users. The system may include the use of a mobile application operating on a user computing device that may be a mobile computing device like a smartphone, a tablet, a wearable, and the like; and/or the system may operate on any type of computing device as a downloadable application or even as a web application.

Figure 1:
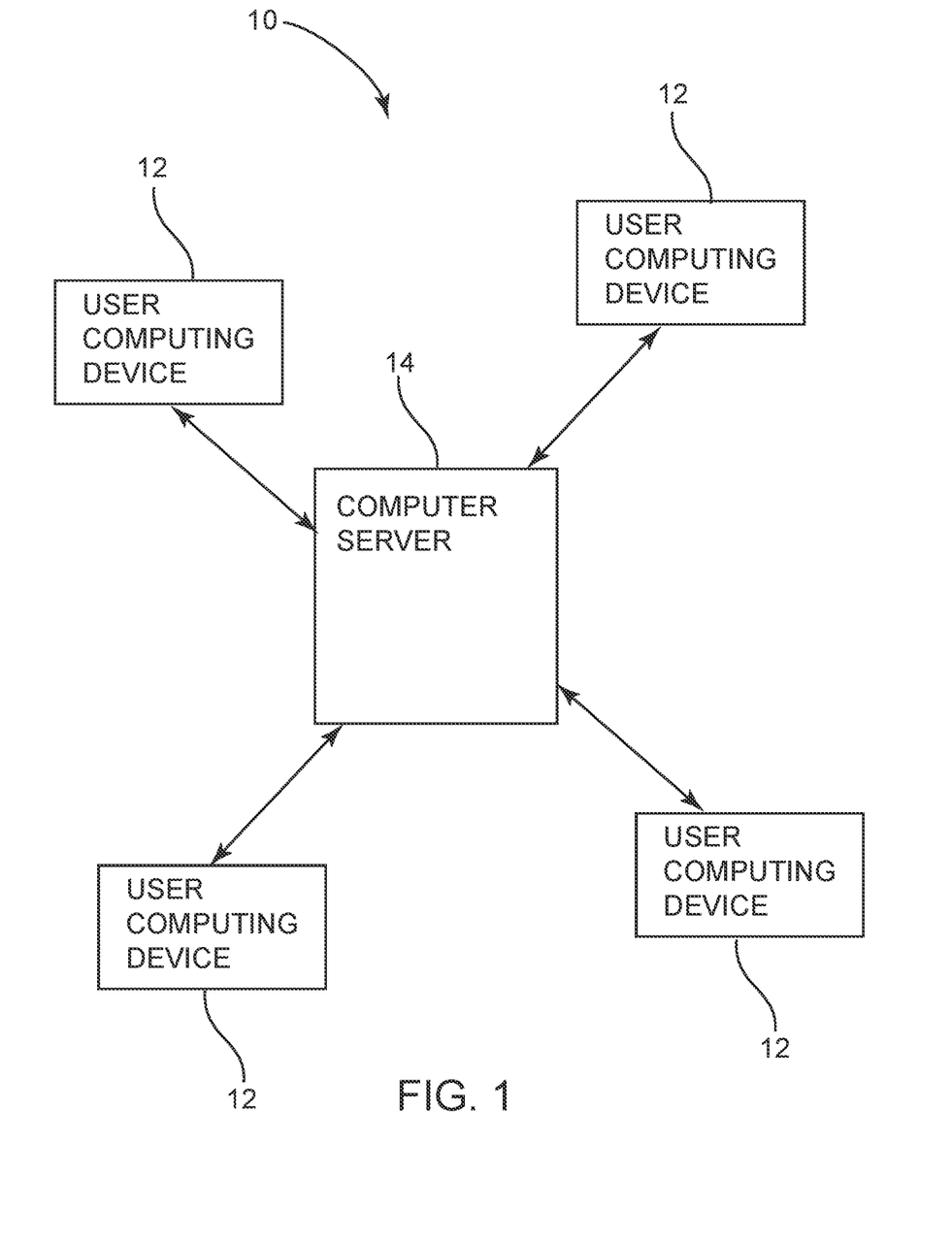
FIG. 1 a diagrammatic view of an open communication system according to an embodiment.

FIG. 1 depicts an embodiment of a social communication system 10. The system 10 may include user computing devices 12 and a server 14, wherein each user computing device 12 is coupled to the computer server 14. This coupling may be a network connection, such as a wireless connection through an Internet connection, a Wi-Fi connection, a Bluetooth connection or the like, wherein the user computing devices 12 may communicate with and receive communication from the server 14. The user computing device 12 may include a desktop computer, a laptop, a tablet, a smartphone, wearable devices and the like. The server 14, in some embodiments, may be a computer server or a cloud-based infrastructure architecture.

The server 14 may include a memory storing user data. The memory of the server 14 may store user data, such as a user name, a password, and profile information. Further, user data may include a dynamic or updateable set of information such as location of the user computing device 12. It will be understood that in operation of the system 10, all of the users are anonymous, wherein no identifying information is provided to other users of the system 10 regarding any of the users utilizing the system 10.

Figure 2:
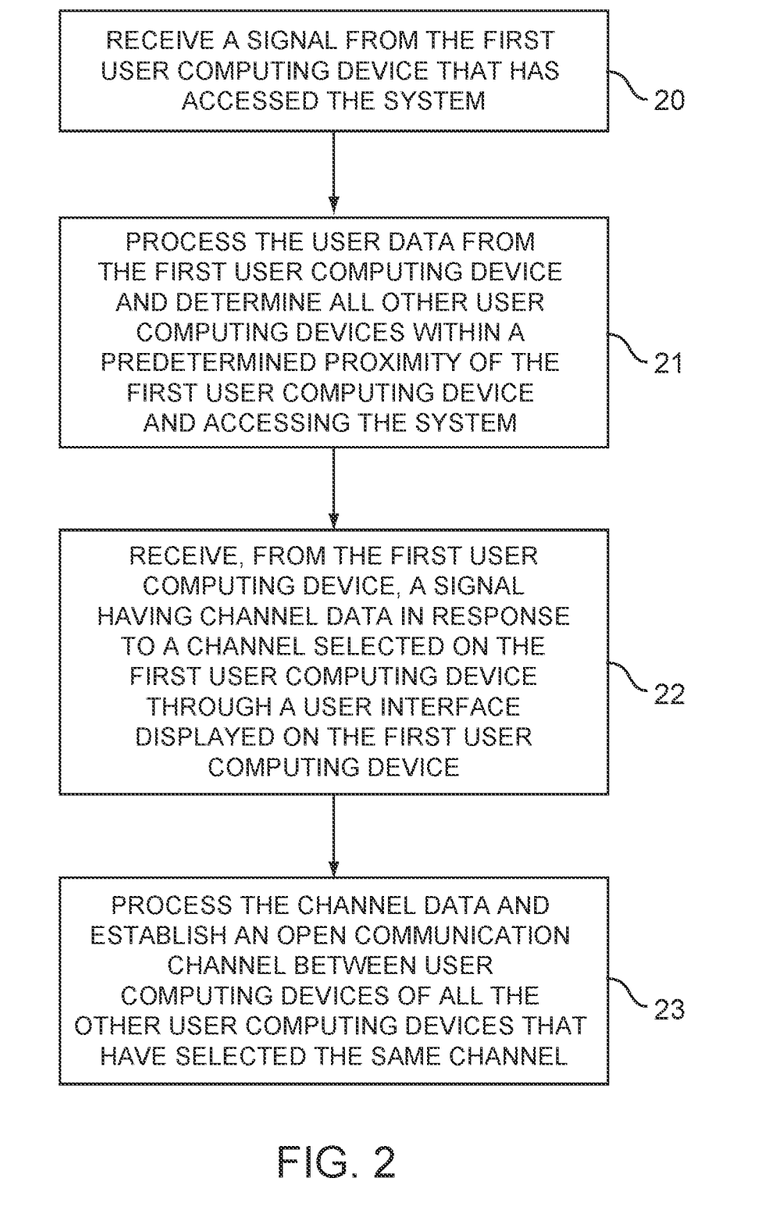
FIG. 2 is a flow chart of instructions executed by a server of an open communication system.

Referring to FIG. 2, the user computing device 12 may be a first user computing device 12 that is coupled to the server 14, and, the server 14 may be programmed to: receive a signal from the first user computing device that has accessed the system (Step 20), wherein the signal includes user data having location information of the user computing device; process the user data from the first user computing device and determine all other user computing devices within a predetermined proximity of the user computing device and accessing the system (Step 21); receive, from the first user computing device, a signal having channel data in response to a channel selected on the first user computing device through a user interface displayed on the first user computing device (Step 22); and process the channel data and establish an open communication channel between user computing devices of all the other user computing devices that have selected the same channel (Step 23). The channels that may be selected may include, without limitation, a trucking channel, a traffic channel, a weather channel, and a teen channel, as depicted in FIG. 5, or may include other channels, such as a site-seeing channel, a sports channel, a good food channel and the like.

Figure 5:
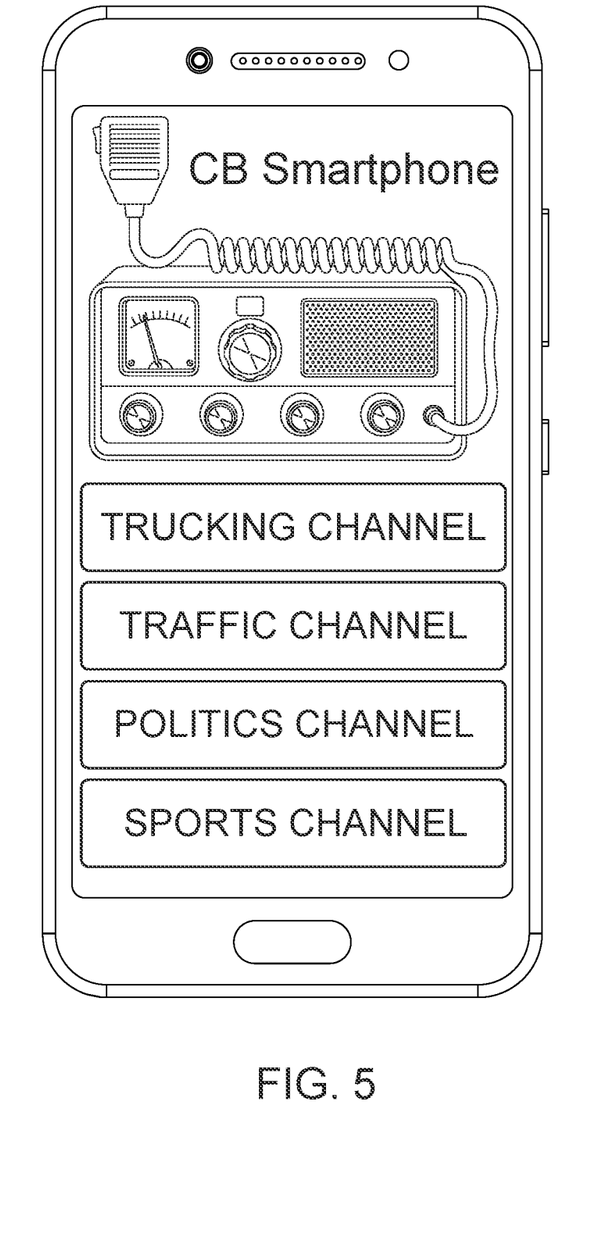
FIG. 5 is view of a user interface of operating on a user computing device of an open communication system according to an embodiment.

Step 22 of receiving the channel data from the first user computing device 12 may include the first user computing device 12 automatically sending the channel data to the server 14 in response to selecting a channel, such as selecting a soft button with the desired channel name as shown in FIG. 5. This sends the specific channel data to the server and the server 14 may then determine all of the user computing devices within proximity of the first user computing device that are on the selected channel and establish an open communication channel with all of the user computing devices within proximity and on that channel. This may include opening another communication node in the established communication channel that connects the first user computing device 12 to the channel.

The open communication channel operates to allow all users within proximity and with the selected channel to communicate with each other, either by voice, text, multimedia and combinations thereof Also, as users may be in motion, the total number of users may adjust by others coming within and others leaving the predetermined proximity to each other. In other words, as a user is in motion with his or her user computing device 12, other users in the ecosystem of the open communication system 10 continuously enter a user's preferred zone of proximity and leave the user's preferred zone of proximity, thereby creating a dynamic ecosystem that may be continuously changing with users being added and removed from the channel of communication.

Figure 6:
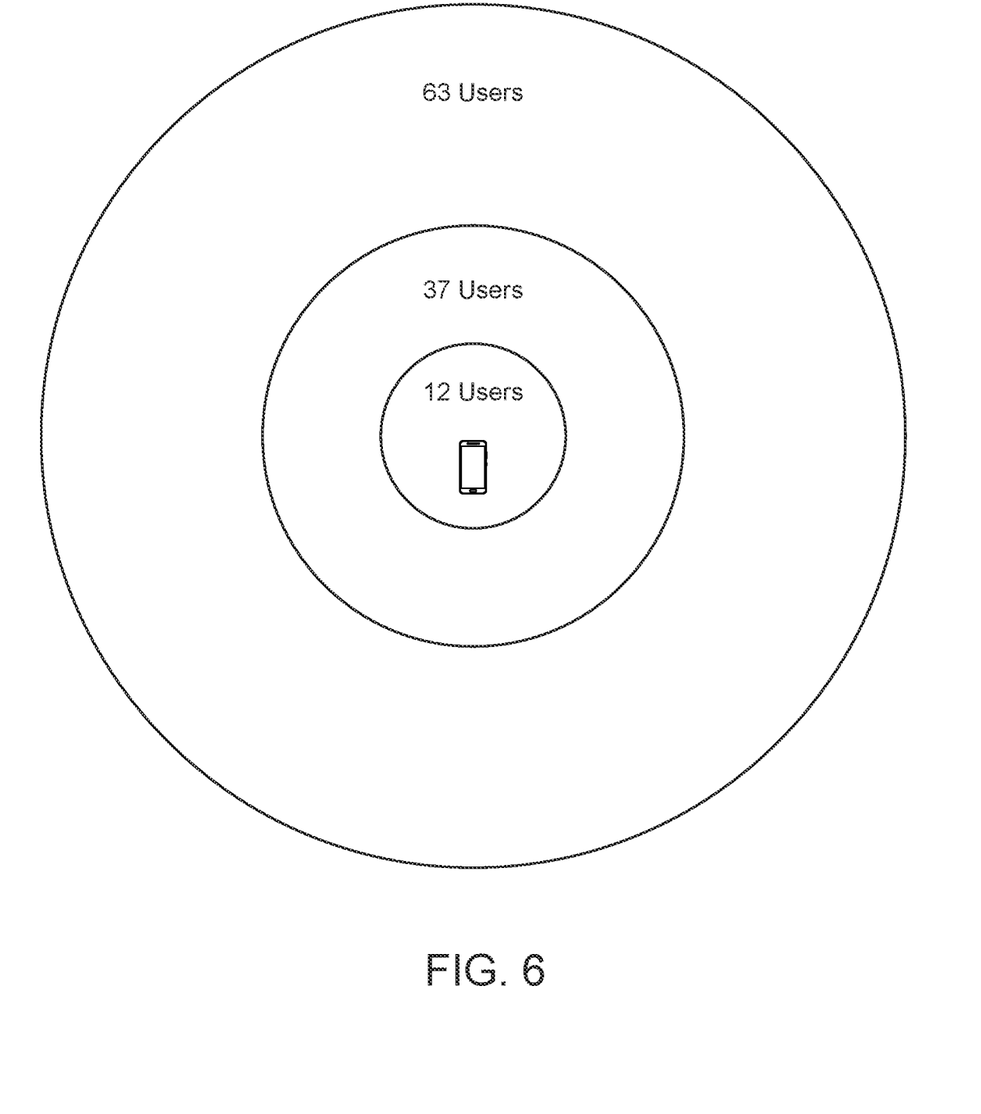
FIG. 6 is a diagrammatic view of a user computing device and an adjustment of the predetermined proximity distance around a user device according to an embodiment.

The predetermined proximity of the user computing devices may be any distance established by the system. In other embodiments, the predetermined distance is between 3 and 20 miles. In embodiments, users may adjust the proximity distance in order to engage more or fewer users depending on the users' preferences, as shown in FIG. 6. Further still, the system may automatically adjust the proximity distance based on density of users within the current proximity in order to reduce or add more users as determined by the system. In some embodiments, the number of users on a particular channel may be limited.

In some embodiments, users can define or create their own channels. For example, and without limitation, a user may create a private channel or user-created topical open channels. The private channel may be used to invite certain users onto the private channel and continue a conversation. A user-created topical channel may be on a topic of interest to the user. For example, and without limitation, a user may create a channel related to Home Town College that is travelling to an away game at Superstar State University. The channel may be called Home Town College Channel, wherein users affiliated with Home Town College may communicate on the user-created topical channel named Home Town College Channel as they travel to Superstar State University.

Figure 7:
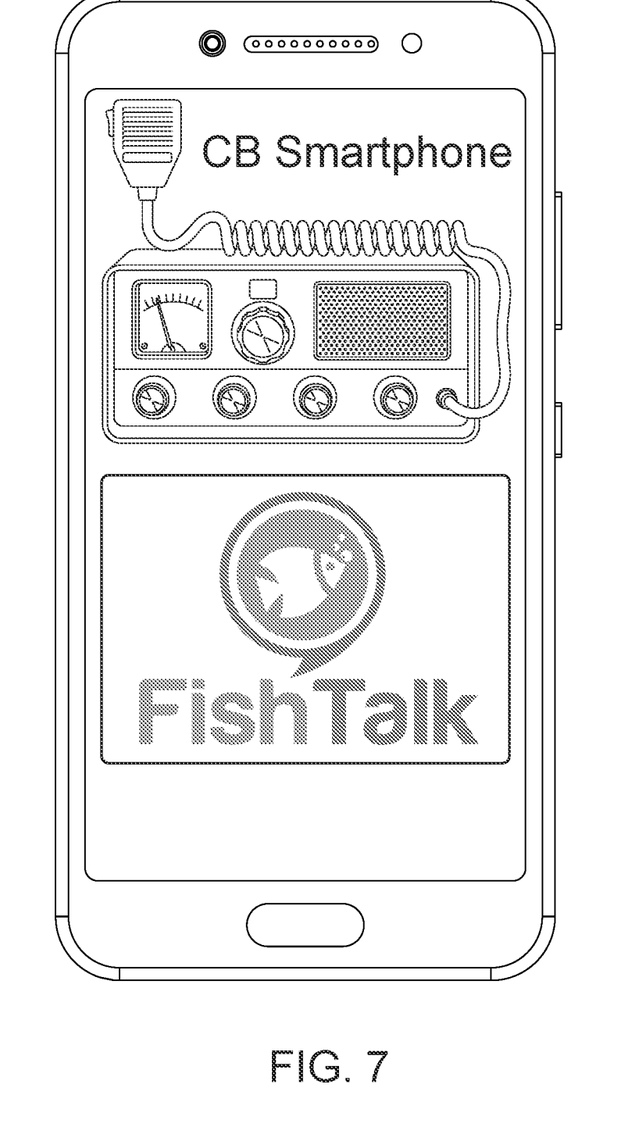
FIG. 7 is a view of a user computing device depicting a dynamically created channel by the open communication system according to an embodiment.

Further still, in some embodiments, the system 10 may include the server 14 that stores detailed user information, such as age, address, college name, political affiliation or preference, sports team preferences, hobbies, and so forth. The system 10 may then automatically and dynamically create topical channels in response to processing the user data of the users accessing the system within the predetermined proximity distance. The processing of the user data may result in finding groups of users with similar profile elements and creating channels in real time related to the commonality between user profiles and sending the real-time created channels to the user devices related to that topical channel, or alternatively can make the real-time created channels available to all users. In some embodiments, there may be an established threshold number of users with common profile data within proximity of each other before a channel is automatically and in real time created. For example, FIG. 7 depicts a dynamically created channel named "FISH TALK" wherein the user profiles included users that had fishing in common and the channel was created in real time, allowing users to select the real-time created channel and talk about fish and/or fishing.

It will also be understood that embodiments of the system 10 may employ natural language processing or similar technology to analyze discussions of users of the system. In these embodiments, the system may identify certain key words or phrases as provided to the system in the programming or in a database. When the system utilizes the natural language processing to identify the keywords or phrases being discussed by users the system may process the keywords and associate the keywords with a user profile in the stored user data or may ask the user if he or she would like to add that keyword to his or her user data. These keywords may then be utilized as topic for the creation of real time channels as discussed above.

The system 10 may also aggregate the data of conversation topics using natural language processing and further may aggregate the data of channel usage.

Additionally, in some embodiments the system 10 may provide or create hosted channels. For example, and without limitation, the system 10 may create a hosted channel for a state, such as Kansas, wherein the hosted Kansas channel includes a hosted user that may be a knowledgeable person about Kansas, an expert on a certain topic that may relate to Kansas or is simply a topic of great interest based on aggregated data, a celebrity or the like. The hosted channel may have a static predetermined proximity or a defined area wherein users that move into and out of the predefined area can access the channel when moving in and then are removed from the channel when moving out of the predefined area. Further still, embodiments may include a system that can allow users to pay for more specialized communication access to an expert, celebrity or the like on a hosted channel, such as paying for a smaller group of users or for a one-on-one conversation using the system 10.

Figure 3:
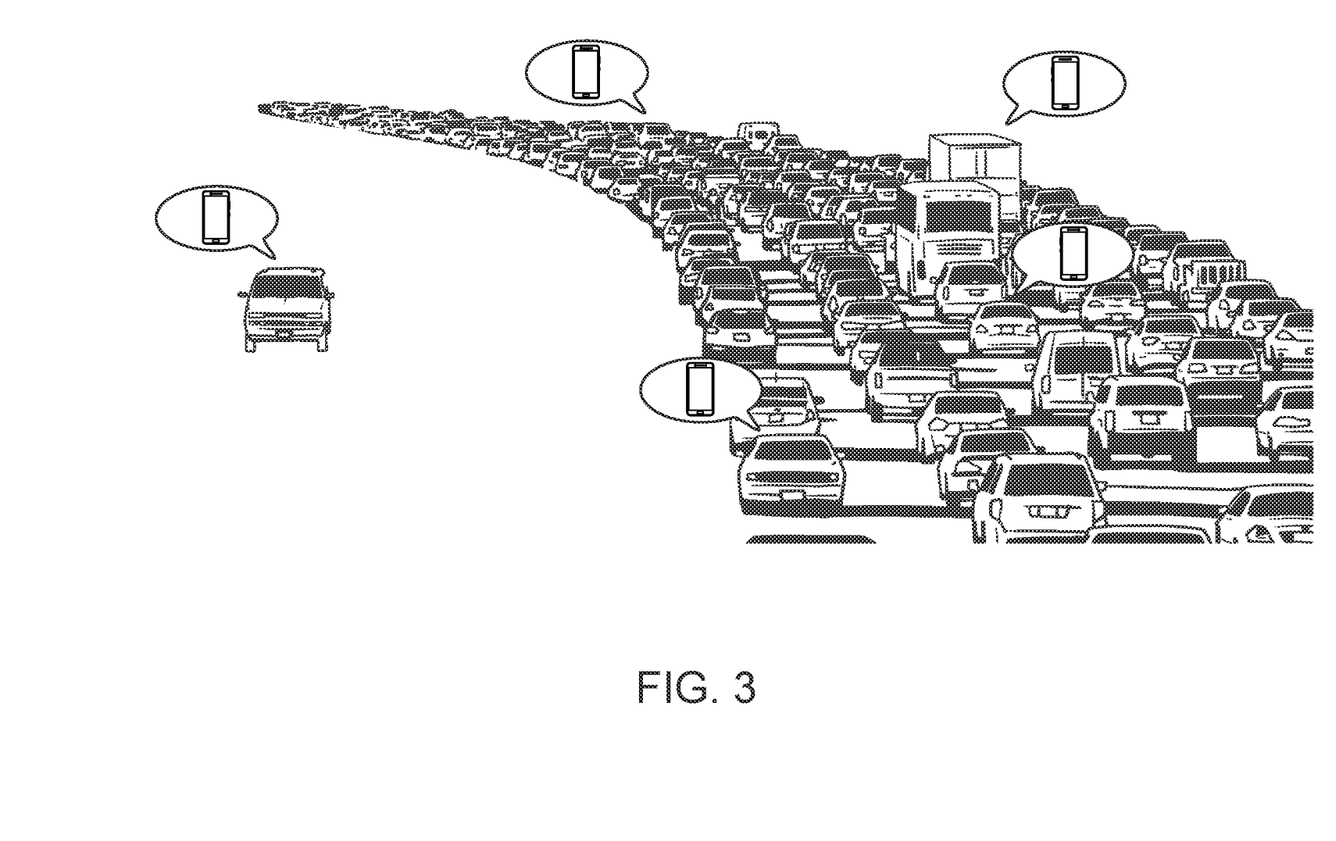
FIG. 3 is a perspective view of user computing devices within vehicles operating an open communication system according to an embodiment.
Figure 4:
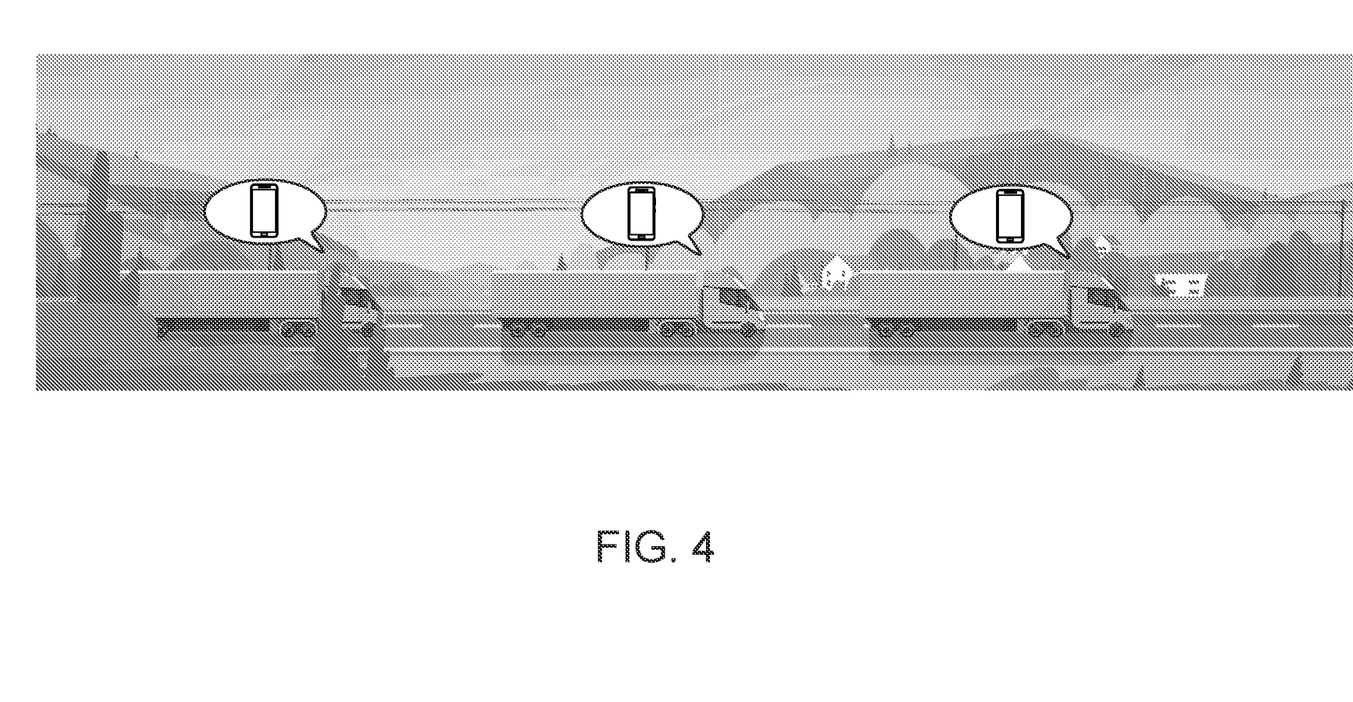
FIG. 4 is a perspective view of user computing devices within trucks operating an open communication system according to an embodiment.

FIG. 3 depicts various vehicles that are engaged in the system, wherein several of the users are within a traffic jam and a car on the road heading a different direction is on an open road. The users may be utilizing a traffic channel in order to give and receive information regarding reasons for the traffic jam and the like, or to have conversation to pass time while in the traffic jam. FIG. 4 depicts a series of tucks wherein the truckers are engaged in conversation on a particular channel, such as the trucking channel. The system may be used to promote safety and share road information.

Figure 8A:
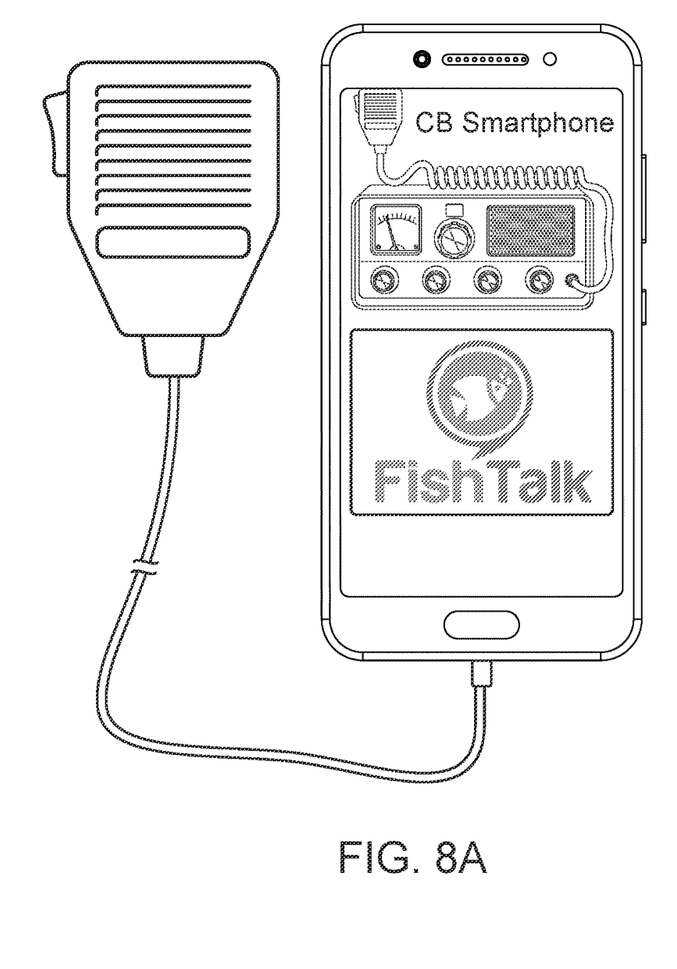
FIG. 8A is a view of a user computing device with a microphone device coupled to the user computing device according to an embodiment.
Figure 8B:
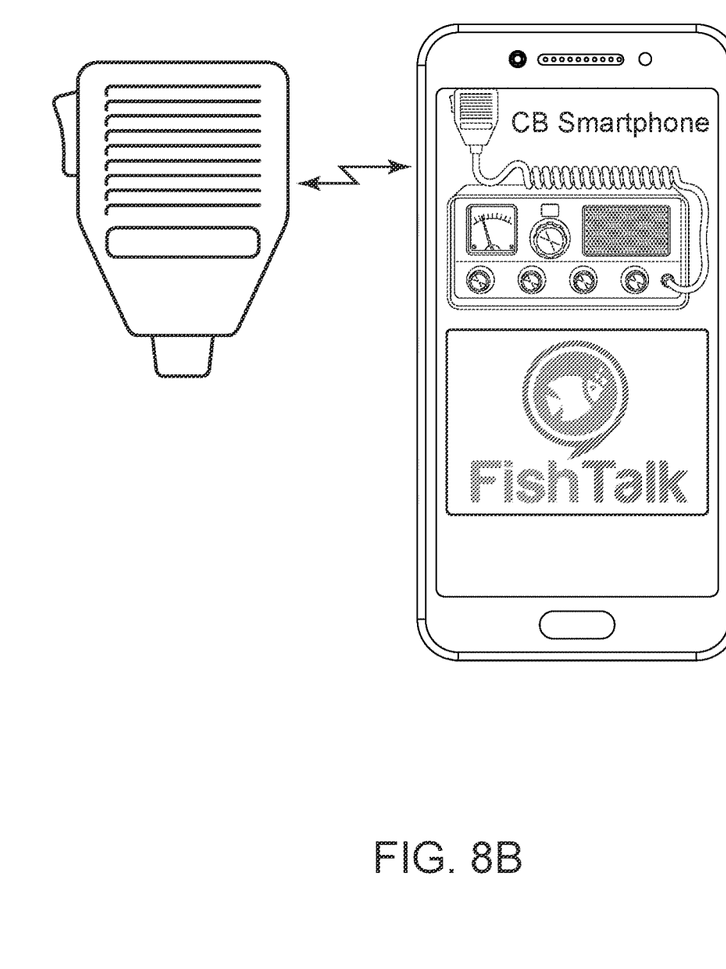
FIG. 8B is a view of a user computing device with a microphone device wirelessly coupled to the user computing device according to an embodiment.

In operation, some embodiments may include a user interface wherein there is an automatic mute of the user computing device to reduce the background noise of those using the system. In these embodiments, the system may require a key in, such as a tactile key in by pressing a soft button on the user computing device or the like, or a verbal hey in feature wherein the user can activate the user computing device to speak or otherwise communicate by utilizing a preset phrase, term or the like. This allows users that merely desire to listen to conversation to be able to do so without creating additional background noise. Additionally, as depicted in FIGS. 8A and 8B the system may include a handset hardware that may include a microphone and an activation button, much like a CB radio handset. The handset hardware may be wired connected (see FIG. 8A) or wirelessly connected (See FIG. 8B) to the user computing device. This allows the user to depress the activation button to speak into the microphone to communicate through the system 10 and provides the user with a CB experience using the system 10.

Embodiments may be available on or through the internet, such as through domain names reserved and owned by Applicant that include CBclone.com, CB-talk.com, CB-chat.com, CB-time.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An open communication system comprising:
a server having a memory storing user data;
a first user computing device coupled to the server; and
a plurality of other user computing devices coupled to the server, wherein the server is programmed to:
receive a signal from the first user computing device having channel data in response to an open communication channel selected on the first user computing device through a user interface displayed on the first user computing device; and
process the channel data and establish an open communication channel between user computing devices of the plurality of other user computing devices that have selected the same open communication channel and the first user computing device, wherein the server is further programmed to allow a user of the first user computing device to create a private channel, and wherein the user of the first user computing device invites at least one user of any of the plurality of other user computing devices having selected the open communication channel to select the private channel, thereby establishing private communication between the user of the first user computing device and the at least one user of any of the plurality of other user computing devices through the private channel.

2. The system of claim 1, wherein the open communication channel is selected from the group consisting of a trucking channel, a traffic channel, a weather channel, a teen channel, a site-seeing channel, a sports channel, and a food channel.

3. The system of claim 1, wherein a communication through the open communication channel is selected from the group consisting of voice, text, multimedia, and combinations thereof.

4. The system of claim 1, wherein the total number of the plurality of other user communication devices located within the predetermined proximity of the first user computing device and having selected the open communication channel decreases as any of the plurality of other user communication devices within the predetermined proximity of the first user computing device having selected the open communication channel moves farther away from the first user computing device than the predetermined proximity, and increases as any of the plurality of other user communication devices farther away from the first user computing device than the predetermined proximity having selected the open communication channel moves to within the predetermined proximity of the first user computing device, dynamically.

\* \* \* \* \*